(12) United States Patent
Bokade et al.

(10) Patent No.: US 12,397,915 B2
(45) Date of Patent: Aug. 26, 2025

(54) ICE PROTECTION SYSTEMS FOR AIRCRAFT FUELED BY HYDROGEN

(71) Applicant: General Electric Company, Schenectady, NY (US)

(72) Inventors: Vilas Bokade, Bengaluru (IN); Vishnu Vardhan Tatiparthi, Bengaluru (IN); Subramani Adhiachari, Bengaluru (IN); Scott Alan Schimmels, Miamisburg, OH (US)

(73) Assignee: General Electric Company, Evendale, OH (US)

( * ) Notice: Subject to any disclaimer, the term of this patent is extended or adjusted under 35 U.S.C. 154(b) by 104 days.

(21) Appl. No.: 17/929,550

(22) Filed: Sep. 2, 2022

(65) Prior Publication Data
US 2024/0076044 A1    Mar. 7, 2024

(51) Int. Cl.
| F02C 7/22 | (2006.01) |
| B64D 15/04 | (2006.01) |
| B64D 27/10 | (2006.01) |
| B64D 37/30 | (2006.01) |
| F02C 7/047 | (2006.01) |
| F02C 7/143 | (2006.01) |

(52) U.S. Cl.
CPC ............. *B64D 15/04* (2013.01); *B64D 27/10* (2013.01); *B64D 37/30* (2013.01); *F02C 7/047* (2013.01); *F02C 7/1435* (2013.01); *F02C 7/22* (2013.01)

(58) Field of Classification Search
CPC . F02C 7/224; F02C 7/047; F02C 7/22; B64D 15/04; B64D 15/06; B64D 15/08; B64D 15/10; B64D 37/02; B64D 37/30; F01D 25/04
See application file for complete search history.

(56) References Cited

U.S. PATENT DOCUMENTS

| 1,715,202 | A | * | 5/1929 | Lewis ................... B64D 15/04 244/134 B |
| 2,379,183 | A | | 6/1945 | Price |
| 9,267,715 | B2 | | 2/2016 | Scheibert |
| 10,183,753 | B2 | | 1/2019 | Pineau et al. |
| 10,494,997 | B2 | | 12/2019 | Lourit et al. |
| 10,717,535 | B2 | | 7/2020 | Blanco Maroto et al. |
| 2004/0177618 | A1 | * | 9/2004 | Placko ................... F02C 3/305 60/39.3 |
| 2009/0108134 | A1 | | 4/2009 | Thodiyil et al. |

(Continued)

*Primary Examiner* — Devon C Kramer
*Assistant Examiner* — Rodolphe Andre Chabreyrie
(74) *Attorney, Agent, or Firm* — Hanley, Flight & Zimmerman, LLC

(57) ABSTRACT

A gas turbine engine including a core air passage, a combustor, and a steam line. The combustor is located in the core air passage and combusts hydrogen fuel producing combustion gases. The steam line is fluidly coupled to the core air passage at a position downstream of the combustor to receive a portion of the combustion gases. A conduit thermally coupled to an external surface of an aircraft may be fluidly coupled to the steam line to receive the combustion gases and to heat the external surface. The gas turbine engine may also include a water vapor condenser fluidly connected to the steam line to receive the combustion gases and to condense the water vapor of the combustion gases. At least one nozzle may be fluidly coupled to the water vapor condenser to inject the condensed water into the core air passage.

11 Claims, 8 Drawing Sheets

(56) References Cited

U.S. PATENT DOCUMENTS

| | | |
|---|---|---|
| 2014/0190162 A1 | 7/2014 | Fonseca |
| 2017/0167382 A1* | 6/2017 | Miller .................... B64D 15/06 |
| 2018/0170555 A1 | 6/2018 | Phillips |
| 2020/0088096 A1* | 3/2020 | Chilukuri ............... B64D 15/04 |
| 2020/0088098 A1* | 3/2020 | Roberge .................... F02C 7/16 |
| 2020/0122844 A1 | 4/2020 | Porte et al. |
| 2022/0111951 A1* | 4/2022 | Shmilovich ............ B64D 13/00 |
| 2022/0381185 A1* | 12/2022 | Muldoon ................. F02C 7/277 |
| 2023/0332522 A1* | 10/2023 | Klingels ................. F02C 7/141 |

\* cited by examiner

ICE PROTECTION SYSTEMS FOR AIRCRAFT FUELED BY HYDROGEN

TECHNICAL FIELD

The present disclosure relates to ice protection systems for aircraft.

BACKGROUND

The formation of ice on aircraft surfaces creates problems for aircraft. For example, ice may form on propellers, inlet guide vanes, wings, air inlets of engines, etc. Accumulated ice adds considerable weight and changes the airfoil or inlet configuration, impacting the controlled airflow of these surfaces and making the aircraft much more difficult to fly. In the case of jet aircraft, pieces of ice breaking loose from the leading edge of an engine inlet housing can damage rotating fan and turbine blades or other internal engine components. When ice forms on inlet guide vanes of an inlet to the core air passage, such damage could occur on compressor blades, or even impact combustion dynamics leading to issues such as flameout.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 5 is a cross-sectional detail view of an inlet to the core air passage, a splitter, and a portion of a low-pressure compressor, showing detail 5 of FIG. 2.

FIG. 6 is a cross-sectional view of the inlet of the core air passage and splitter taken along line 6-6 in FIG. 2.

FIG. 7 is a cross-sectional detail view of the nacelle showing detail 7 of FIG. 2.

FIG. 8 is cross-sectional view of the nacelle taken along line 8-8 in FIG. 2.

DETAILED DESCRIPTION

Figure 1:
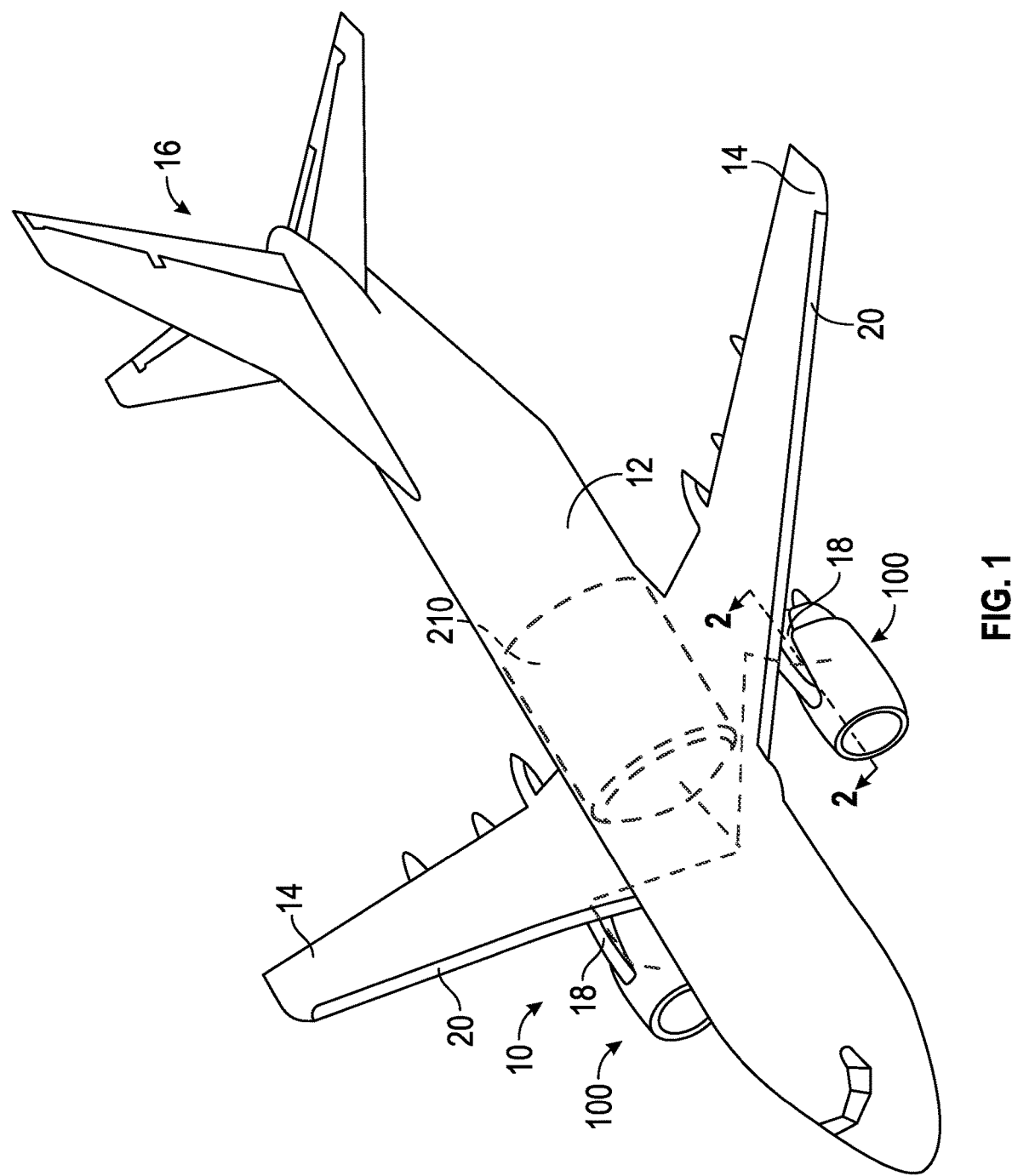
FIG. 1 shows an aircraft that may use ice protection systems of the present disclosure.

Features, advantages, and embodiments of the present disclosure are set forth or apparent from a consideration of the following detailed description, drawings, and claims. Moreover, the following detailed descriptions are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another, and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

Various aircraft surfaces, including surfaces of the engine for the aircraft, are subject to icing conditions. One such surface is the inlet guide vane for the core air passage. Another such surface is an engine nacelle. Ice protection systems that may be suitably used for the inlet guide vane, nacelle, or other suitable aircraft surfaces are discussed herein. These ice protection systems may be used to remove ice buildup (de-icing) and to prevent ice buildup (anti-icing).

The ice protection systems discussed herein are used in engines using hydrogen fuel (diatomic hydrogen) instead of combustible hydrocarbon liquid fuel, for example. Hydrogen fuel may be used to reduce carbon dioxide emissions from commercial aircraft. A byproduct (combustion product) of hydrogen combustion is water vapor (steam). The ice protection systems discussed herein utilize this steam byproduct to remove ice buildup (de-icing) and to prevent ice buildup (anti-icing).

The ice protection systems discussed herein are suitable for use on aircraft. FIG. 1 shows an aircraft 10 that may implement various preferred embodiments. The aircraft 10 includes a fuselage 12, a pair of wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 200 (see FIG. 3). In the embodiments discussed herein, the fuel is a hydrogen fuel that is stored in a fuel tank 210 of the fuel system 200. As shown in FIG. 1, at least a portion of the fuel tank 210 is located in the fuselage 12 and, in this embodiment, entirely within the fuselage 12. The fuel tank 210, however, may be located at other suitable locations in the fuselage 12 or the wing 14, such as with a portion of the fuel tank 210 in the fuselage 12 and a portion of the fuel tank 210 in the wing 14. Alternatively, the fuel tank 210 may also be located entirely within the wing 14. In the embodiment shown in FIG. 1, a single fuel tank 210 is used, and the fuel tank 210 is located within the fuselage such that, relative to the forward direction and the aft direction, the fuel tank 210 is located at the wing center of lift. Any suitable number of fuel tanks 210 may be used including a plurality of fuel tanks 210. The plurality of fuel tanks 210 may include, for example, a forward fuel tank and an aft fuel tank. The forward fuel tank and the aft fuel tank may be located in the fuselage 12 and balanced about the wing center of lift to promote the stability of the aircraft 10 during flight. In another example, the plurality of fuel tanks 210 may include two separate tanks, each located within a corresponding wing 14.

Although the aircraft 10 shown in FIG. 1 is an airplane, the embodiments described herein may also be applicable to other aircraft 10, including, for example, helicopters and unmanned aerial vehicles (UAV). The aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible). In addition, the embodiments described herein may also be applicable to other applications where hydrogen is used as a fuel. The engines described herein are gas turbine engines, but the embodiments described herein also may be applicable to other engines. Further, the engine, specifically, the gas turbine engine, is an example of a power generator using hydrogen as a fuel, but hydrogen may be used as a fuel for other power generators, including, for example, fuel cells (hydrogen fuel cells). Such power generators may be used in various applications including stationary power-generation systems (including both gas turbines and hydrogen fuel cells) and other vehicles beyond the aircraft 10 explicitly described herein, such as boats, ships, cars, trucks, and the like.

Figure 2:
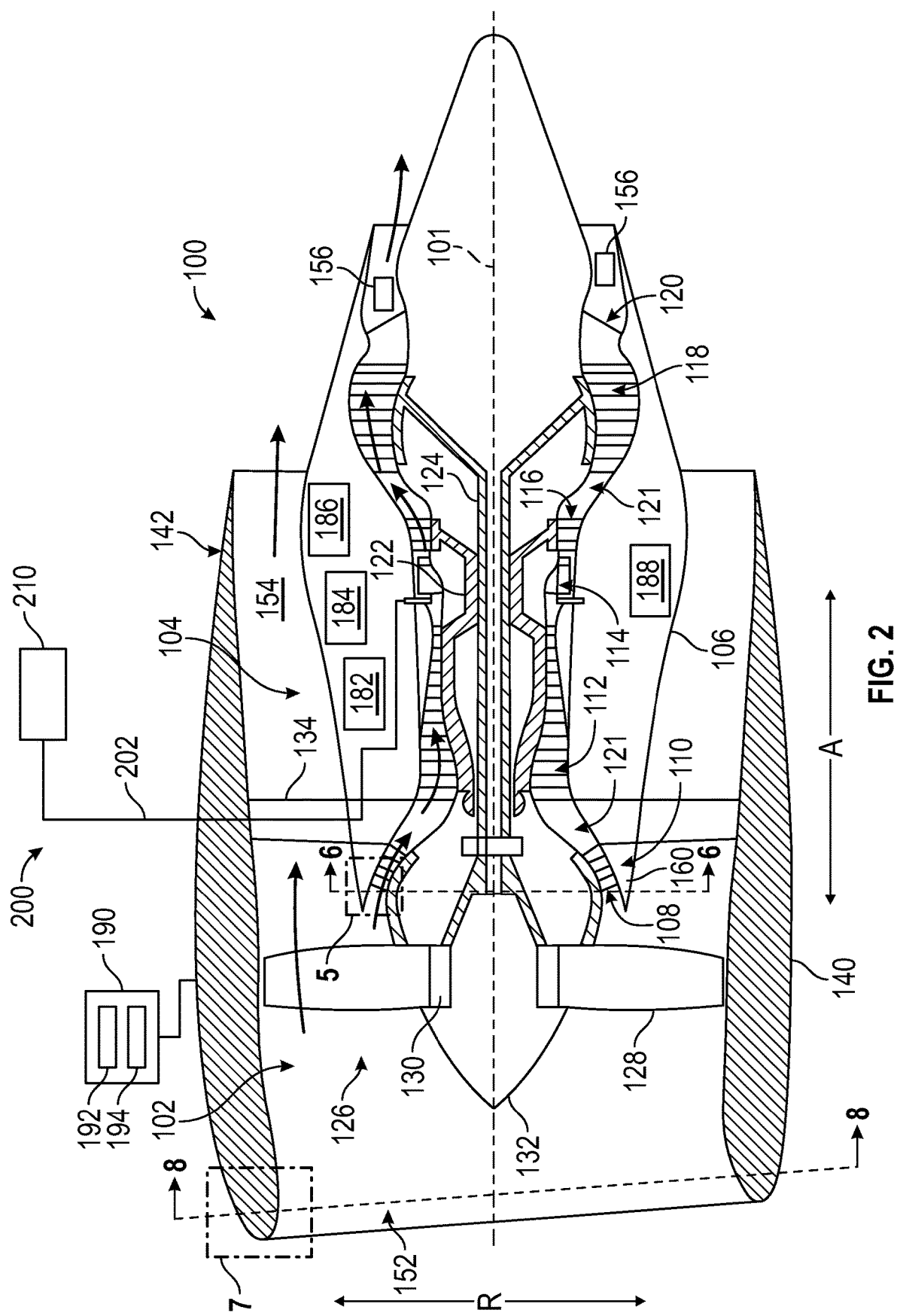
FIG. 2 is a schematic, cross-sectional view, taken along line 2-2 in FIG. 1, of one of the engines of the aircraft, shown in FIG. 1.

FIG. 2 is a schematic, cross-sectional view of one of the engines 100 used in the propulsion system for the aircraft 10 shown in FIG. 1. The engine 100 shown in FIG. 2 is a high-bypass turbofan engine. The engine 100 may also be referred to as a turbofan engine 100 herein. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

The turbomachine 104 depicted in FIG. 2 includes a tubular outer casing 106 (housing or nacelle) that defines an inlet 108. The inlet 108 is annular, having a circumferential direction in the circumferential direction of the engine 100. The outer casing 106 encases, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define, at least in part, a core air flow path extending from the inlet 108 to the jet exhaust nozzle section 120. These components, and other components of the gas turbine engine 100, are arranged to form a core air passage 121 to define the core air flow path and through which the core air flows. The turbofan engine further includes one or more drive shafts. More specifically, the turbofan engine includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The fan section 102 shown in FIG. 2 includes a fan 126 having a plurality of fan blades 128 coupled to a disk 130 spaced apart in a circumferential direction around the disk 130. The fan blades 128 and the disk 130 are rotatable, together, about the longitudinal centerline (axis) 101 by the LP shaft 124. The disk 130 is covered by a rotatable front hub 132 aerodynamically contoured to promote an airflow through the plurality of fan blades 128. Further, an annular fan casing or outer nacelle 140, circumferentially surrounds the fan 126 and/or at least a portion of the turbomachine 104. The outer nacelle 140 will be referred to as the nacelle 140 herein. The nacelle 140 is annular and defines an inlet 152 of the fan section 102. Although the nacelle 140 may be symmetrical, the nacelle 140 and the inlet 152 may be asymmetrical, such as having asymmetry between the top and the bottom, and asymmetry between the left and the right. The nacelle 140 is supported relative to the turbomachine 104 by a plurality of circumferentially spaced outlet guide vanes 134. A downstream section 142 of the nacelle 140 extends over an outer portion of the turbomachine 104 so as to define a bypass airflow passage 154 therebetween.

Air flows from the left side of FIG. 2 toward the right side of FIG. 2 and enters the inlet 152. A portion of the air flow may flow past the fan blades 128 and the outlet guide vanes 134 through the bypass airflow passage 154. A portion of the air flow may enter the outer casing 106 through the inlet 108 as the air flowing through the core air passage 121 to be mixed with the fuel for combustion in a combustor 176 (see FIG. 4) of the combustion section 114 and exit through the jet exhaust nozzle section 120, as discussed above. These two airflow passages (the bypass airflow passage 154 and the inlet 108) and associated airflows are separated from each other by a splitter nose 160. The splitter nose 160 is referred to herein as a splitter 160. The nacelle 140 helps to direct the flow of air into the fan blades 128 of the fan 126, and the splitter 160 is aerodynamically contoured to help to direct the flow of air into the inlet 108 and through the bypass airflow passage 154.

The turbofan engine 100 is operable with the fuel system 200 and receives a flow of fuel from the fuel system 200. As described further below, the fuel system 200 includes a fuel delivery assembly 202 providing the fuel flow from the fuel tank 210 to the engine 100 and, more specifically, to a fuel manifold 172 (see FIG. 3) of the combustion section 114 of the turbomachine 104 of the turbofan engine 100.

The turbofan engine 100 also includes various accessory systems to aid in the operation of the turbofan engine 100 and/or an aircraft including the turbofan engine 100. For example, the turbofan engine 100 may include a main lubrication system 182, a compressor cooling air (CCA) system 184, an active thermal clearance control (ATCC) system 186, and a generator lubrication system 188, each of which is depicted schematically in FIG. 2. The main lubrication system 182 is configured to provide a lubricant to, for example, various bearings and gear meshes in the compressor section, the turbine section, the HP spool 122, and the LP shaft 124. The lubricant provided by the main lubrication system 182 may increase the useful life of such components and may remove a certain amount of heat from such components. The compressor cooling air (CCA) system 184 provides air from one or both of the HP compressor 112 or the LP compressor 110 to one or both of the HP turbine 116 or the LP turbine 118. The active thermal clearance control (ATCC) system 186 cools a casing of the turbine section to maintain a clearance between the various turbine rotor blades and the turbine casing within a desired range throughout various engine operating conditions. The generator lubrication system 188 provides lubrication to an electronic generator (not shown), as well as cooling/heat removal for the electronic generator. The electronic generator may provide electrical power to, for example, a start-up electrical motor for the turbofan engine 100 and/or various other electronic components of the turbofan engine 100 and/or an aircraft including the turbofan engine 100.

Heat from these accessory systems 182, 184, 186, 188, and other accessory systems may be provided to various heat sinks as waste heat from the turbofan engine 100 during operation, such as to various vaporizers 221, 223, as discussed below with regard to FIG. 3. Additionally, the turbofan engine 100 may include one or more heat exchangers 156 within, for example, the core air passage 121, such as the turbine section or the jet exhaust nozzle section 120. Such heat exchangers 156 are referred to herein as core air heat exchangers 156 and may be used to extract waste heat from an airflow therethrough also to provide heat to various heat sinks, such as the vaporizers 221, 223, discussed below.

The turbofan engine 100 discussed herein is, of course, provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Further still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include, or be operably connected to, one or more of the accessory systems 182, 184, 186, and 188, as discussed above.

The engine 100 may also include an engine controller 190. The engine controller 190 is configured to operate various aspects of the engine 100, the fuel system 200, and ice protection systems 300, 302 (see FIG. 3), and in some embodiments, the engine controller 190 is a Full Authority Digital Engine Control (FADEC). In this embodiment, the engine controller 190 is a computing device having one or more processors 192 and one or more memories 194. The processor 192 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 194 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 194 can store information accessible by the processor 192, including computer-readable instructions that can be executed by the processor 192. The instructions can be any set of instructions or a sequence of instructions that, when executed by the processor 192, causes the processor 192 and the engine controller 190 to perform operations. In some embodiments, the instructions can be executed by the processor 192 to cause the processor 192 to complete any of the operations and functions for which the engine controller 190 is configured, as will be described further below. The instructions can be software written in any suitable programming language, or can be implemented in hardware. Additionally, and/or alternatively, the instructions can be executed in logically and/or virtually separate threads on the processor 192. The memory 194 can further store data that can be accessed by the processor 192.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
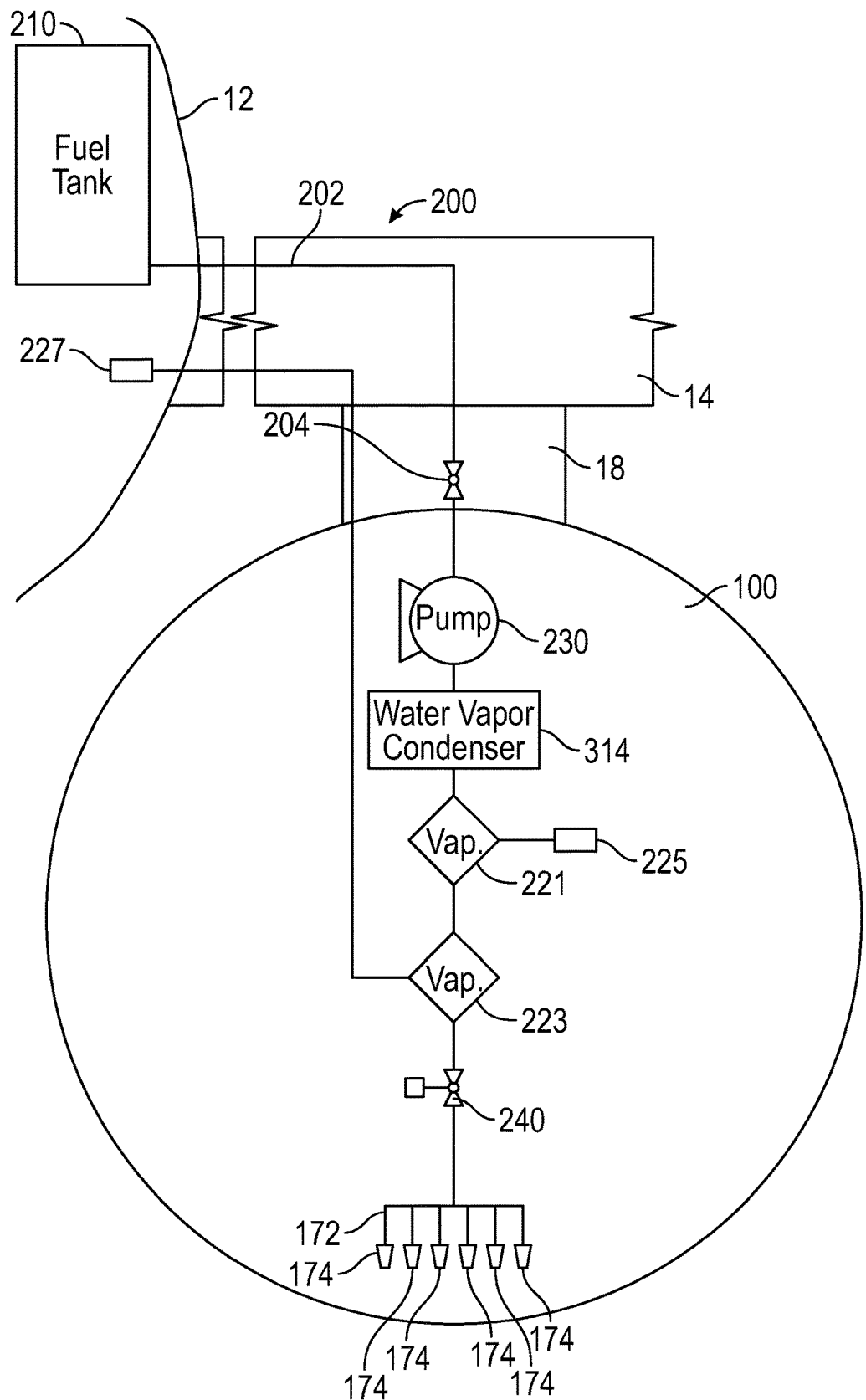
FIG. 3 is a schematic diagram of a fuel system for the aircraft shown in FIG. 1.

FIG. 3 is a schematic view of the fuel system 200 according to an embodiment of the present disclosure. The fuel system 200 is configured to store the hydrogen fuel for the engine 100 in the fuel tank 210 and to deliver the hydrogen fuel to the engine 100 via a fuel delivery assembly 202. The hydrogen fuel used in the engine 100 and in the fuel system 200 may be substantially pure hydrogen molecules (diatomic hydrogen). The fuel delivery assembly 202 includes tubes, pipes, and the like, to fluidly connect the various components of the fuel system 200 to the engine 100. The fuel tank 210 may be configured to hold the hydrogen fuel at least partially within the liquid phase, and may be configured to provide hydrogen fuel to the fuel delivery assembly 202 substantially completely in the liquid phase, such as completely in the liquid phase. For example, the fuel tank 210 may have a fixed volume and contain a volume of the hydrogen fuel in the liquid phase (liquid hydrogen fuel). As the fuel tank 210 provides hydrogen fuel to the fuel delivery assembly 202 substantially completely in the liquid phase, the volume of the liquid hydrogen fuel in the fuel tank 210 decreases, and the remaining volume in the fuel tank 210 is made up by, for example, hydrogen in the gaseous phase (gaseous hydrogen). As used herein, the term "substantially completely," as used to describe a phase of the hydrogen fuel, refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 210 at very low (cryogenic) temperatures. For example, the hydrogen fuel may be stored in the fuel tank 210 at about negative two hundred fifty-three degrees Celsius or less at atmospheric pressure, or at other temperatures and pressures to maintain the hydrogen fuel substantially in the liquid phase. The fuel tank 210 may be a double-walled cryogenic storage tank made from known materials such as titanium, Inconel®, aluminum, or composite materials. The fuel tank 210 and the fuel system 200 may include a variety of supporting structures and components to facilitate storing the hydrogen fuel in such a manner.

The liquid hydrogen fuel is supplied from the fuel tank 210 to the fuel delivery assembly 202. The fuel delivery assembly 202 may include one or more lines, conduits, pipes, etc., configured to carry the hydrogen fuel between the fuel tank 210 and the engine 100. The fuel delivery assembly 202 provides a flow path of the hydrogen fuel from the fuel tank 210 downstream to the engine 100. In the discussion of FIG. 3, the terms "downstream" and "upstream" may be used to describe the position of components relative to the direction of flow of the hydrogen fuel in the flow path of the fuel delivery assembly 202. The fuel delivery assembly 202 may also include various valves (for example, shut-off valve 204) and other components to deliver the hydrogen fuel to the engine 100 that are not shown in FIG. 3. The fluid lines discussed herein, particularly, those conveying liquid hydrogen, may be vacuum jacketed pipes.

The fuel tank 210 in this embodiment is a hydrogen fuel source, and the fuel delivery assembly 202 is configured to receive hydrogen fuel from the fuel tank 210 (hydrogen fuel source) and to provide the hydrogen fuel from the hydrogen fuel source to the engine 100 (power generator) and, more specifically, a fuel input array (e.g., the fuel manifold 172 and the fuel nozzles 174, discussed further below) of the engine 100. The fuel system 200 may include a shut-off valve 204, positioned, for example, in the pylon 18 or at another position between the fuel tank 210 and the engine 100 that can be used to isolate and to disconnect the fuel tank 210 from the components of the fuel delivery assembly 202 that are downstream of the shut-off valve 204. The shut-off valve 204 may, thus, be positioned to isolate the components of the fuel system 200 that are located in the engine from the components of the fuel system 200 located in the remaining portion of the aircraft 10.

The hydrogen fuel is delivered to the engine 100 by the fuel delivery assembly 202 in the liquid phase, the gaseous phase, the supercritical phase, or both of the gaseous phase and the supercritical phase. The fuel system 200, thus, includes at least one vaporizer 221, 223 in fluid communication with the fuel delivery assembly 202 to heat the liquid hydrogen fuel flowing through the fuel delivery assembly 202. In the embodiment shown in FIG. 3, the fuel system 200 includes two vaporizers, a main vaporizer 221 and a secondary vaporizer 223. Each vaporizer 221, 223 is positioned in the flow path of the hydrogen fuel between the fuel tank 210 and the engine 100. In the embodiment shown in FIG. 3, each vaporizer 221, 223 is positioned at least partially within the engine 100. When positioned in the engine 100, the vaporizers 221, 223 may be located in the nacelle 140, for example. The vaporizers 221, 223 may, however, be positioned at other suitable locations in the flow path of the hydrogen between the fuel tank 210 and the engine 100. For example, the vaporizers 221, 223 may be positioned externally to the engine 100 and positioned in the fuselage 12, the wing 14, or the pylon 18.

Each vaporizer 221, 223 is in thermal communication with at least one heat source, such as a primary heat source 225, a secondary heat source 227, or both. In this embodiment, the primary vaporizer 221 is configured to operate once the engine 100 is in a thermally stable condition, and the primary heat source 225 is waste heat from the engine 100. The primary vaporizer 221 is, thus, thermally connected to at least one of the main lubrication systems 182, the compressor cooling air system 184, the active thermal clearance control system 186, the generator lubrication system 188, and the core air heat exchangers 156 to extract waste heat from the engine 100 to heat the hydrogen fuel. In such a manner, the vaporizer 221 is configured to operate by drawing heat from the primary heat source 225 once the engine 100 is capable of providing enough heat, via the primary heat source 225, to the vaporizer 221, in order to facilitate operation of the vaporizer 221.

The secondary vaporizer 223 of this embodiment is a combination start-up and trim vaporizer that may be used to heat the liquid hydrogen fuel flowing through the fuel delivery assembly 202 when the primary vaporizer 221 is not sufficient to heat the hydrogen fuel. During start-up of the engine 100, for example, the engine 100 may not be in a thermally stable condition, and the secondary vaporizer 223 is used during start-up (or prior to start-up) to heat the hydrogen fuel instead of the primary vaporizer 221. In this example, the secondary vaporizer 223 operates as a start-up vaporizer. In another example, the primary vaporizer 221 may not be heating the hydrogen fuel to the desired temperature and, thus, the secondary vaporizer 223 operates as a trim vaporizer to add supplemental heat to the hydrogen fuel and to heat the hydrogen fuel to the desired temperature. Such a condition may occur when, for example, the heat provided by the primary heat source 225 to the primary vaporizer 221 is not sufficient to heat the hydrogen fuel to the desired temperature.

The secondary vaporizer 223 is thermally coupled to a secondary heat source 227. With the secondary vaporizer 223 operating as a combination start-up and trim vaporizer, the secondary heat source 227 is preferably a heat source external to the engine 100 that may provide heat for the secondary vaporizer 223 independent of whether or not the engine 100 is running and can be used, for example, during start-up (or prior to start-up) of the engine 100. The secondary heat source 227 may include, for example, an electrical power source, a catalytic heater or burner, and/or a bleed airflow from an auxiliary power unit. The secondary heat source 227 may be integral to the secondary vaporizer 223, such as when the secondary vaporizer 223 includes one or more electrical resistance heaters, or the like, that are powered by the electrical power source.

As noted above, the vaporizers 221, 223 may be thermally coupled to any suitable heat source. For example, the primary vaporizer 221 and/or the secondary vaporizer 223 may be thermally coupled to both waste heat from the engine 100 and a heat source external to the engine 100. In the embodiment shown in FIG. 3, the primary vaporizer 221 and the secondary vaporizer 223 are located in series relative to the flow of hydrogen in the fuel delivery assembly 202, with the secondary vaporizer 223 being downstream from the primary vaporizer 221. Other arrangements of the vaporizers 221, 223 may, however, be used.

The fuel delivery assembly 202 also includes a pump 230 to induce the flow of the hydrogen fuel through the fuel delivery assembly 202 to the engine 100. The pump 230 may generally be the primary source of pressure rise in the fuel delivery assembly 202 between the fuel tank 210 and the engine 100. The pump 230 may be configured to increase pressure in the fuel delivery assembly 202 to a pressure greater than a pressure within a combustion chamber of the combustion section 114 of the engine 100 (FIG. 2). In this embodiment, the pump 230 is positioned within the flow of hydrogen fuel in the fuel delivery assembly 202 at a location upstream of the primary vaporizer 221. In this embodiment, the pump 230 is positioned externally to the fuselage 12 and the wing 14, and is positioned at least partially within the pylon 18, or at least partially within the engine 100. More specifically, the pump 230 is positioned within the engine 100. With the pump 230 located in such a position, the pump 230 may be any suitable pump configured to receive the flow of hydrogen fuel in substantially completely a liquid phase. In other embodiments, however, the pump 230 may be positioned at any other suitable locations, including other positions within the flow path of the hydrogen fuel. For example, the pump 230 may be located downstream of the primary vaporizer 221 and may be configured to receive the flow of hydrogen fuel through the fuel delivery assembly 202 in a substantially completely a gaseous phase or a supercritical phase.

The fuel system 200 also includes a fuel metering unit in fluid communication with the fuel delivery assembly 202. In this embodiment, the fuel metering unit is a metering valve 240 positioned downstream of the vaporizers 221, 223 and the pump 230. The metering valve 240 is configured to receive hydrogen fuel in a substantially completely gaseous phase, or in a substantially completely supercritical phase. The metering valve 240 is further configured to provide the flow of fuel to the engine 100 in a desired manner. More specifically, as depicted schematically in FIG. 3, the metering valve 240 is configured to provide a desired volume of hydrogen fuel at, for example, a desired flow rate, to a fuel manifold 172 of the engine 100. The fuel manifold 172 then distributes (provides) the hydrogen fuel received to a plurality of fuel nozzles 174 within the combustion section 114 of the engine 100. The plurality of fuel nozzles 174 injects the hydrogen fuel into a combustion chamber of the combustor 176 (see FIG. 4) where the hydrogen fuel is mixed with compressed air, and the mixture of hydrogen fuel and compressed air is combusted to generate combustion gases that drive the engine 100. These combustion gases, also referred to herein as combustion products, include water vapor (steam). As the atmospheric air also includes nitrogen, the combustion products may also include nitrogen oxides together with unreacted nitrogen gas. Adjusting the metering valve 240 changes the volume of fuel provided to the combustion section 114 of the engine 100 and, thus, changes the amount of propulsive thrust produced by the engine 100 to propel the aircraft 10.

In some embodiments, the fuel system 200 also may include a water vapor condenser 314 in fluid communication with the fuel delivery assembly 202. As will be discussed further below, the water vapor condenser 314 may be used to extract heat from water vapor using the hydrogen fuel flowing through the water vapor condenser 314 as a heat sink. The extracted heat may be used to increase the temperature of the hydrogen fuel. In this embodiment, the water vapor condenser 314 is positioned upstream of the primary vaporizer 221 and downstream of the pump 230. The water vapor condenser 314 may, however, be located at other positions within the hydrogen flow path including, for example, downstream of the vaporizers 221, 223 and upstream of the metering valve 240.

Figure 4:
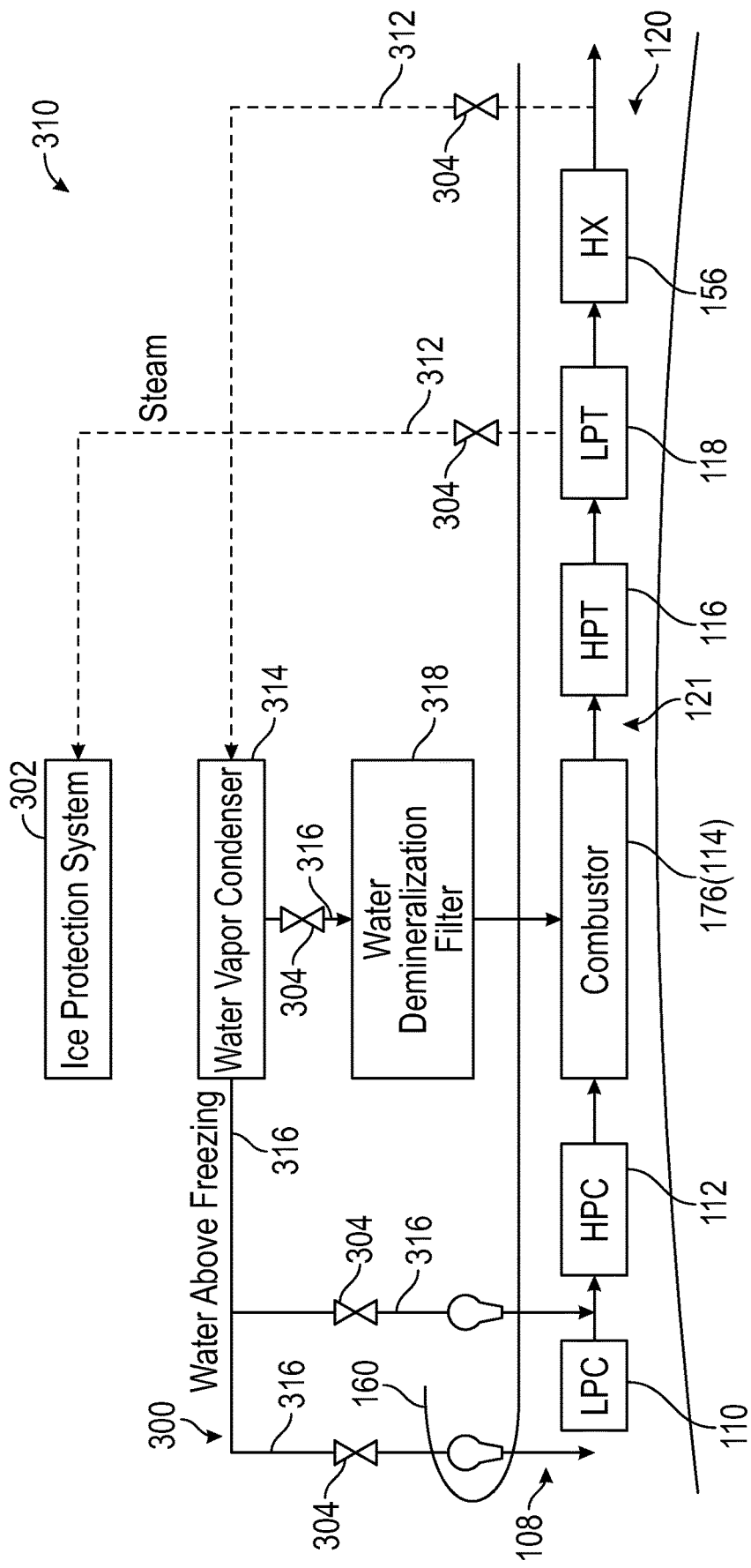
FIG. 4 is a schematic diagram of the core air flow path of the engine shown in FIG. 2 and ice protection systems of the present disclosure.

FIG. 4 is a schematic diagram of the core air flow path (core air passage 121) of the engine shown in FIG. 2 connected to ice protection systems 300, 302 of the present disclosure. The ice protection systems 300, 302 are auxiliary systems of the engine 100. As discussed above, the core air flow path includes, in a serial relationship, the LP compressor 110, the HP compressor 112, the combustor 176 of the combustion section 114, the HP turbine 116, the LP turbine 118, and the core air heat exchangers 156. The splitter 160 guides a portion of the air that enters the engine 100 through the inlet 152 into the inlet 108 of the core air passage 121. This air is ambient air including oxygen and nitrogen. Air entering through the inlet 108 is compressed by blades of a plurality of fans of the LP compressor 110 and the HP compressor 112.

The compressed air then flows into a combustion chamber of the combustor 176 where the compressed air is mixed with hydrogen fuel provided by the fuel system 200 (see FIG. 3) and injected into the combustion chamber, as discussed above, to form a fuel and air mixture. The mixture of fuel and compressed air is combusted in the combustion chamber of the combustor 176, producing combustion gases at a high temperature. As noted above, these combustion gases, also referred to herein as combustion products, include water vapor (steam). As the atmospheric air also includes nitrogen, the combustion products may also include nitrogen oxides together with unreacted nitrogen gas. The combustion gases (combustion products) accelerate as the combustion gases leave the combustion chamber, and are expelled through an outlet of the combustion chamber (combustor 176) to drive the engine 100. The combustion gases (combustion products) turn the turbines (e.g., to drive the turbine blades) of the HP turbine 116 and the LP turbine 118. As discussed above, the HP turbine 116 and the LP turbine 118, among other things, drive the LP compressor 110 and the HP compressor 112.

As noted above, the core air heat exchanger 156 may also be positioned in the core air flow path (core air passage 121). In this embodiment, the core air heat exchanger 156 is positioned within the jet exhaust nozzle section 120, downstream of the LP turbine 118. The core air heat exchanger 156 is fluidly connected to the core air passage 121 to receive the combustion products and to extract heat from the combustion products, particularly, the water vapor, thereby reducing the temperature of the combustion products downstream of the LP turbine 118. The water in the combustion products may be beneficially used in the engine 100 and, more specifically in the embodiments discussed herein, in ice protection systems 300, 302 for the engine 100 and/or the aircraft 10. The engine 100 includes a water delivery assembly 310. The water delivery assembly 310 includes tubes, pipes, and the like, to fluidly connect the various components of the engine 100 and/or aircraft 10. The water delivery assembly 310 includes at least one steam line 312 that is fluidly connected to the core air passage 121 at a position downstream of the combustor 176. A portion of the combustion gases, including water vapor (steam), is directed in the steam line 312 to be used in various systems of the engine 100 and/or aircraft 10. Preferably, the steam line 312 is fluidly connected to the core air passage 121 at a position downstream of the HP turbine 116 such as within the LP turbine 118 or even downstream of the LP turbine 118 and upstream of the core air heat exchanger 156. The steam line 312 connected to the core air passage 121 may be used to fluidly connect the core air passage 121 to an ice protection system 302 using the water vapor of the combustion products.

The water vapor in the combustion products may be condensed to liquid water and the condensed water is used for in various engine systems, such as the ice protection system 300 discussed further below. When used in such a manner, the steam line 312 may be fluidly connected to the water vapor condenser 314 to receive the water vapor in the combustion gases from the core air passage 121. The water vapor condenser 314 extracts heat from the combustion gases condensing the water vapor to a liquid phase (condensed) water. The water vapor condenser 314 includes a heat sink, such as a working fluid, to extract the heat from the combustion gases. In some embodiments, the working fluid may be the hydrogen fuel, as discussed above, with respect to FIG. 3. However, other suitable working fluids may be used, including for example, supercritical carbon dioxide. When the water vapor condenser 314 is used, the steam line 312 is preferably fluidly connected to the core air passage 121 to receive the coldest portion of the combustion gases. The steam line 312 may be preferably connected to the core air passage 121 at a position downstream of the core air heat exchanger 156. By connecting the steam line 312 at this position, the water vapor condenser 314 needs to extract less heat to condense the water vapor in the combustion gases than if the steam line 312 were connected to the core air passage 121 upstream of the core air heat exchanger 156.

The water delivery assembly 310 also includes water lines 316 that are used to fluidly connect the outlet of the water vapor condenser 314 to the various systems using the condensed water from the combustion gases. Such systems include the ice protection system 300, discussed further below. The condensed water from the combustion gases, however, may be used for other purposes and systems. For example, each of the LP compressor 110, the HP compressor 112, and/or the combustor 176 is fluidly connected to the water vapor condenser 314, and the condensed water from the combustion gases may be injected into each of the LP compressor 110, the HP compressor 112, and/or the combustor 176 to cool these components. The condensed water from the combustion gases may be used, for example, as a diluent and injected with the hydrogen fuel into the combustion chamber of the combustor 176, among other things, to reduce the combustion temperature and to inhibit nitrogen oxide production. When used as a diluent, a water demineralization filter 318 may be fluidly connected in the water line 316 between the water vapor condenser 314 and the combustor 176 to filter the condensed water from the combustion gases.

The flow of steam or the condensed water through the delivery assembly 310 may be controlled by any suitable means. In this embodiment, valves 304 are positioned in the delivery assembly 310 and, more specifically in the steam line 312 and in the water line 316, to control the flow of steam or condensed water therethrough. The valve 304 may include an open position allowing the steam or condensed water to flow through the steam line 312 or water line 316 and a closed position isolating systems and components downstream of the valve 304. Any suitable valve may be used including, for example, flow control valves, such flow control valves may include a plurality of open positions controlling the flow rate of steam or condensed water. The ice protection systems 300, 302 discussed herein may be activated by opening at least one of the valves 304 to allow steam or condensed water to flow through the appropriate steam line 312 or water line 316. As will be discussed further below, the valves 304 may be communicatively and operably coupled to the controller 190, and the controller 190 may be configured to operate the valve 304 to activate, deactivate, or otherwise control the systems discussed herein, such as the ice protection systems 300, 302.

Figure 5:
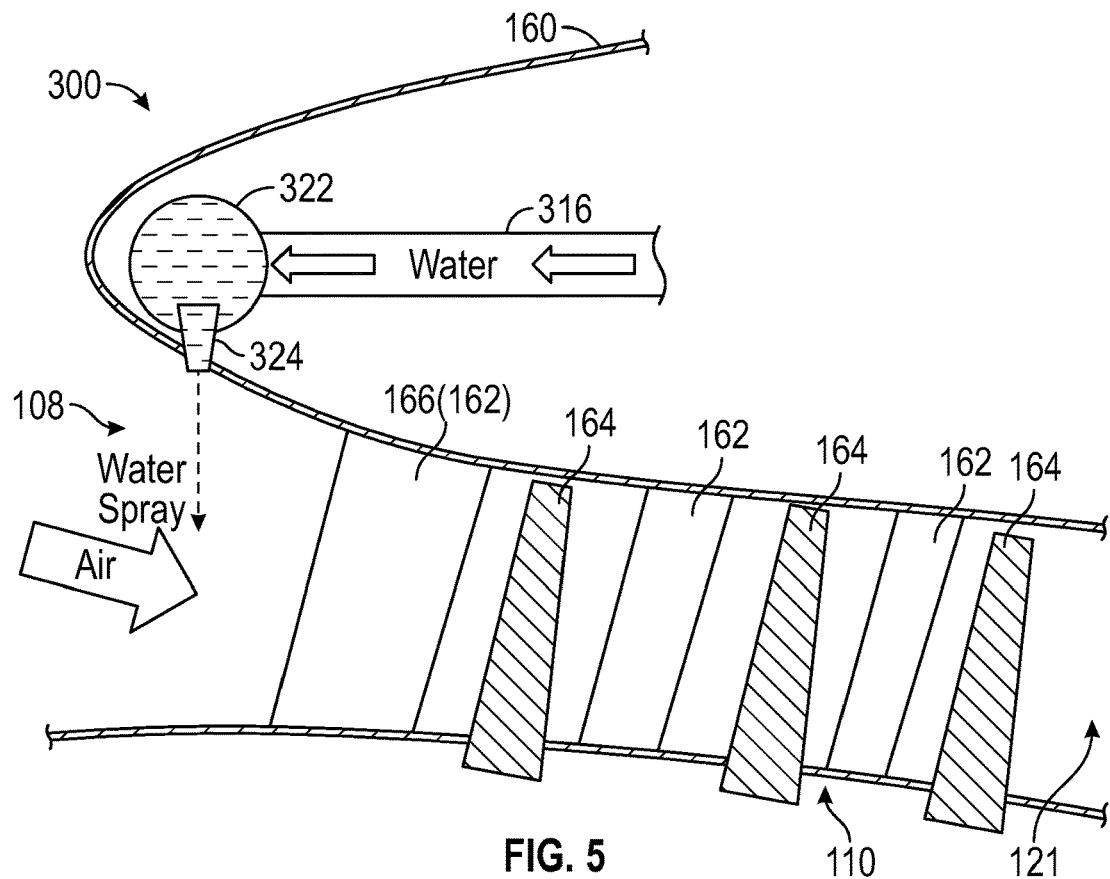
FIG. 5 shows an ice protection system according to an embodiment of the present disclosure.
Figure 6:
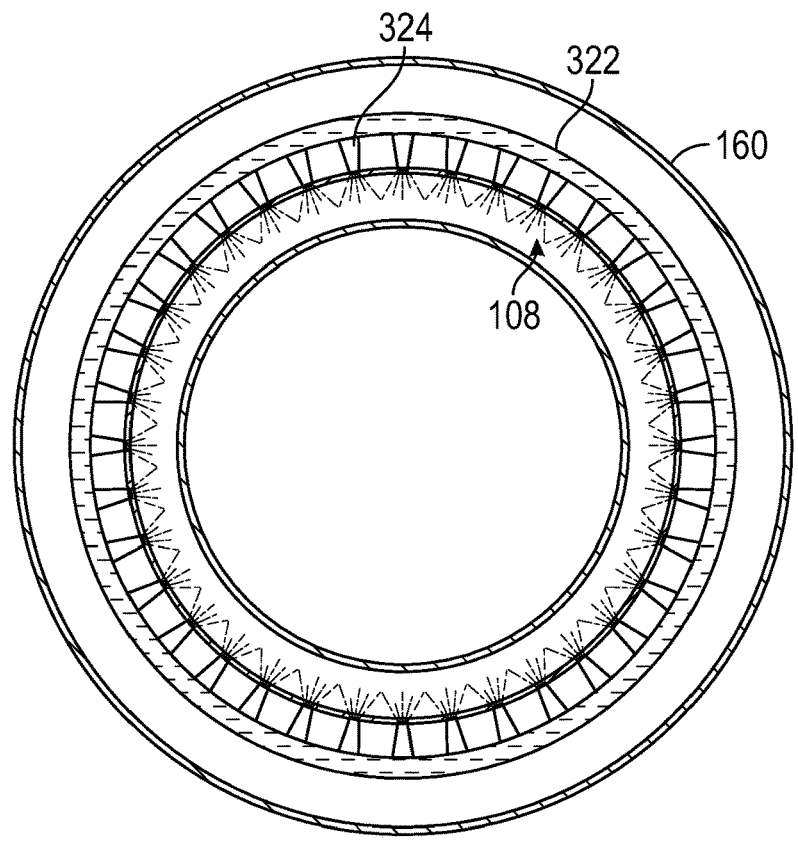
FIG. 6 shows the ice protection system shown in FIG. 5.

FIGS. 5 and 6 show the ice protection system 300 according to an embodiment of the present disclosure. FIG. 5 is a cross-sectional detail view of the inlet 108 to the core air passage 121, the splitter 160, and portions of the LP compressor 110. FIG. 5 shows detail 5 of FIG. 2. FIG. 6 is a cross-sectional view of the inlet 108 of the core air passage 121 and splitter 160 taken along line 6-6 in FIG. 2. Some details of the engine 100, such as the LP shaft 124, are omitted in FIG. 6 for clarity. The LP compressor 110 may include alternating rows of stationary vanes 162 (or nozzles) and rotating compressor blades 164. The vanes 162 guide the flow of air into the compressor blades 164. As noted above, the LP turbine 118 is drivingly connected to the LP compressor 110, and the LP turbine 118 rotates (drives) the compressor blades 164 of the LP compressor 110 to compress the air flowing through the core air passage 121. The first vane 162 located at or downstream of the inlet 108 and before the first disk of compressor blades 164 is an inlet guide vane 166.

Under certain conditions, fully or partially glaciated ice-crystal may be present in the atmosphere. These ice-crystal may be ingested in the engine and may accrete (stick) to the LP compressor 110 and, more specifically, the vanes 162 of the LP compressor and the first vane of the HP compressor 112. This type of icing may be referred to as ice crystal icing (ICI). Icing of these vanes 162 impacts the controlled airflow across these surfaces, reducing the effectiveness of the LP compressor 110 and HP compressor 112 and, more specifically, the LP and HP compressor blades 164. This ice may also shed off of the vanes 162 (including first vane of HP compressor) during operation, damaging downstream components in the core air passage 121, such as the downstream vanes 162 and the compressor blades 164, for example. This shed ice may also flow into the combustor adding an influx of cold water that results in, for example, flameout. Such icing may cause other issues such as an uncommanded decrease in instant fan speed (rollback).

The susceptibility of the vanes 162 to this type of icing (ICI susceptibility) may be a function of the melt ratio of the ice crystals flowing into the inlet 108. The melt ratio is the ratio of the liquid water content in the air to the solid water content in the air. The ICI susceptibility is high (likely to occur) when the melt ratio is less than about forty percent, but the ICI susceptibility is low (unlikely to occur) when the melt ratio is greater than about forty percent. The ice protection system 300 of this embodiment injects water into the inlet 108 upstream of the LP compressor 110 and, more specifically, upstream of the inlet guide vane 166. By adding water in this location, particularly, water that is at a temperature higher than the water/ice content of the air flowing into the inlet 108, the melt ratio is increased to conditions where ICI susceptibility is low (e.g., melt ratios above forty percent). The injected water temperature is also at a temperature higher than freezing that prevents re-freezing of the injected water by forming a film of hot water on to the vanes 162 that further aids in prevention of ICI accretion.

In this embodiment, the water injected into the inlet 108 upstream of the LP compressor 110 is the condensed water from the combustion gases, as discussed above with reference to FIG. 3. Various suitable configurations may be used to inject the condensed water from the combustion gases into the inlet 108. In this embodiment, the ice protection system 300 includes a water distribution header 322 that is fluidly connected to the core air passage 121 downstream of the combustor 176 by the water delivery assembly 310. The water distribution header 322 is fluidly connected to the water line 316 to receive the condensed water from the water vapor condenser 314. The water distribution header 322 is fluidly connected to a plurality of nozzles 324 to distribute the condensed water from the combustion gases to the nozzles 324. Each nozzle 324 is configured to inject the water, for example, by spraying the water into the inlet 108 upstream of the inlet guide vane 166. As schematically shown in FIG. 5, the nozzle 324 may spray the water in a direction that crosses a direction of the airflow into the inlet 108. As noted above, the inlet 108 is annular and the plurality of nozzles 324 are arrayed in the circumferential direction of the inlet 108, as shown in FIG. 6.

The ice protection system 300 may also be operated to prevent other types of icing conditions. For example, when the atmospheric air flowing into the inlet 108 includes supercooled liquid (SCL) droplets, the vanes 162, particularly, the inlet guide vane 166 and the splitter 160, may be susceptible to ice formation in these conditions (SCL icing). Activating the ice protection system 300 in the manner discussed above also prevents such icing. In addition to preventing icing, the ice protection system 300 and the configuration described above and shown in FIGS. 5 and 6, may also be used for operation during hot weather conditions (for example, ambient temperatures greater than eighty degrees Fahrenheit) in order to improve the performance of the LP compressor 110 and/or the HP compressor 112. During high temperature conditions, the condensed water from the combustion gases may be sprayed using the nozzles 324 discussed above to reduce the temperature of the air flowing through the LP compressor 110 and/or the HP compressor 112. When used with the HP compressor 112 the nozzles 324 (and water distribution header 322) may be positioned upstream of the HP compressor 112 and downstream of the LP compressor 110. Also, as noted above, the condensed water from the combustion gases may be used as a diluent in the combustor 176 and injected into the combustion chamber using suitable nozzles.

Figure 7:
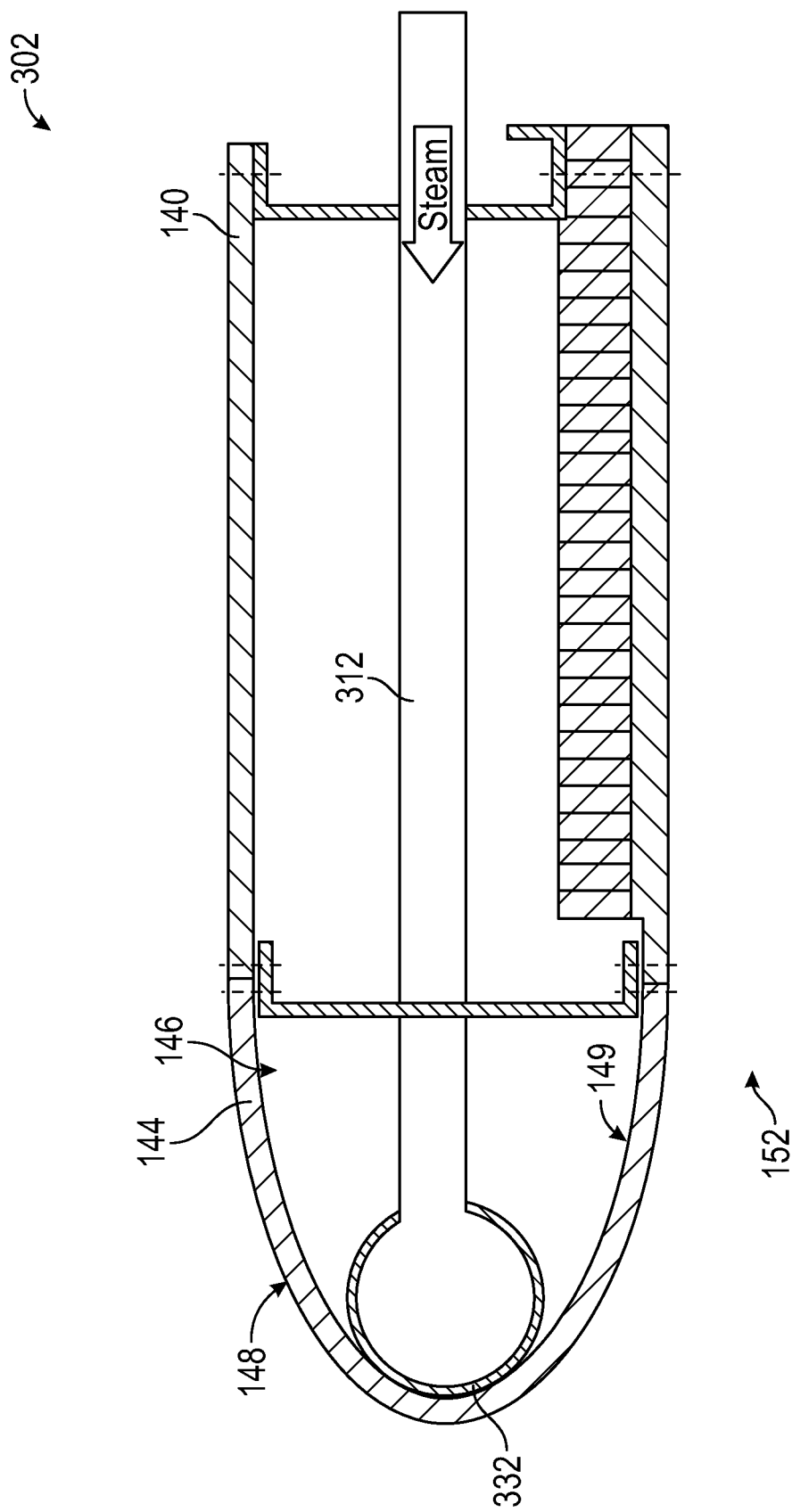
FIG. 7 shows an ice protection system according to another embodiment of the present disclosure.
Figure 8:
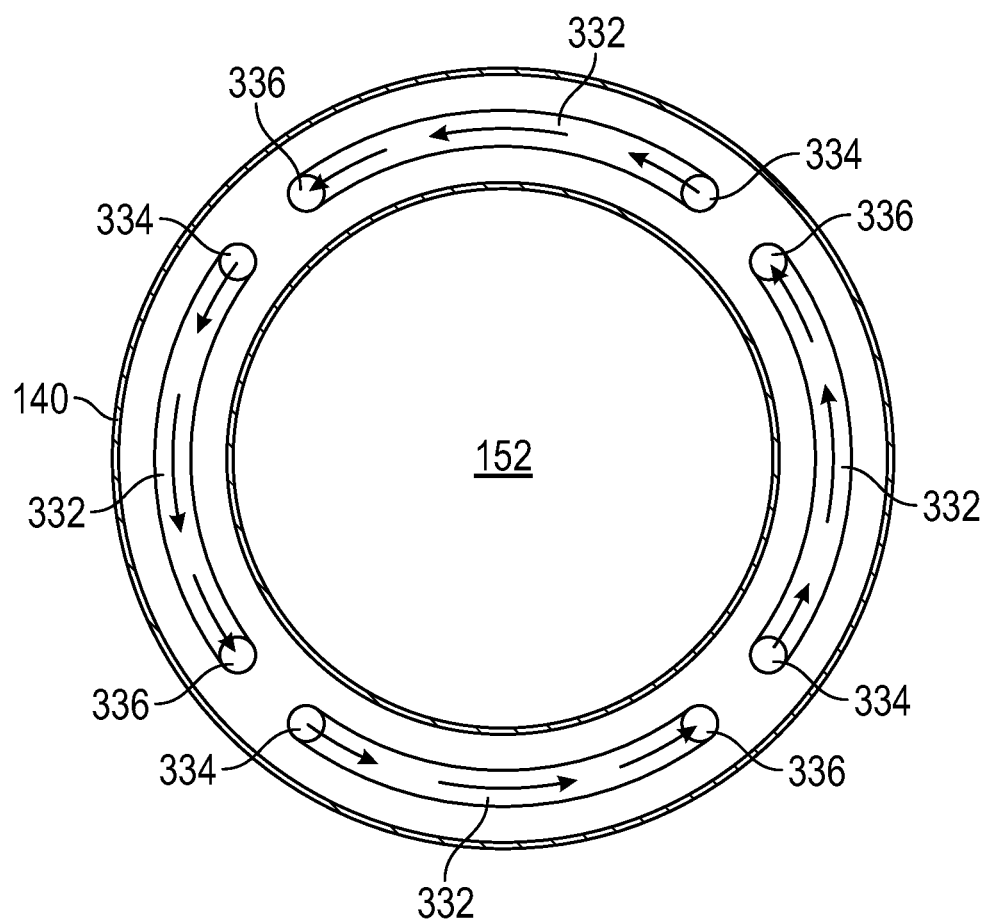
FIG. 8 shows the ice protection system shown in FIG. 5.

FIGS. 7 and 8 show the ice protection system 302 according to another embodiment of the present disclosure. FIG. 7 is a cross-sectional detail view of the nacelle 140 showing detail 7 of FIG. 2, and FIG. 8 is cross-sectional view of the nacelle 140 taken along line 8-8 in FIG. 2. The fan 126 is omitted for clarity in FIG. 8. The nacelle 140 includes a lip 144 formed on the forward end of the nacelle 140. The lip 144 is aerodynamically contoured to promote airflow into the inlet 152 of the fan section 102, and the flow of air over an outer barrel surface of the nacelle 140 (outer surface of the nacelle 140). In this embodiment, the lip 144 has a U-shape with a leading (or forward) portion, an inner portion, and an outer portion. The lip 144 defines a lip cavity 146, which may be referred to as a D-duct. The lip cavity 146 is annular in this embodiment. The lip 144 also includes an outer surface 148 and an inner surface 149. Air flows over the outer surface 148, and the inner surface 149 faces the lip cavity 146.

The nacelle 140 includes the ice protection system 302. Although the ice protection system 302 is shown in this embodiment as being used with the nacelle 140, the ice protection system 302 may be used with other aircraft surfaces (as discussed below) including the splitter 160. The ice protection system 302 is configured to heat the lip 144 and to prevent ice from forming thereon, or if ice has already formed on the lip 144, to de-ice the lip 144. The ice protection system 302 uses heat from water vapor (steam) to heat the lip 144. The water vapor (steam) used in this embodiment is the water vapor (steam) from the combustion gases. In this embodiment, the ice protection system 302 includes a coil 332 that is fluidly connected to the core air passage 121 downstream of the combustor 176 by the water delivery assembly 310. The coil 332 is fluidly connected to the steam line 312 to receive the water vapor (steam) from the combustion gases in the core air passage 121. The coil 332 has an inlet 334 and an outlet 336. The steam line 312 is fluidly connected to the inlet 334 of the coil 332 and the water vapor flows into the coil 332 though the inlet 334. The water vapor flows through the coil 332 from the inlet 334 to the outlet 336. The coil 332 is thermally coupled to the inner surface 149 of the lip 144 and heat is extracted from the water vapor as the steam flows through the coil 332, heating the outer surface 148 and de-icing or otherwise preventing the build-up of ice on the lip 144. At least some of the water is condensed as the water vapor flows through the coil 332 and condensed water flows out of the coil 332 though the outlet 336. This condensed water may be rejected to atmosphere or stored for another use, such as, for example, use as a coolant in a heat exchanger. The condensed water flowing through the outlet 336 may be part of a two-phase mixture including the condensed water and residual water vapor (steam) from the combustion gases that are not condensed.

The coil 332 is shown in FIGS. 7 and 8 as a single pass coil, but other suitable coils, including, for example, serpentine coils, may be used. Instead of the coil 332, the water vapor (steam) may be thermally coupled to the inner surface 149 using other suitable methods including, for example, injecting the water vapor (steam) into the lip cavity 146. A distribution manifold may be fluidly connected to the lip cavity 146 and configured to distribute the hot air water vapor (steam) within the lip cavity 146. Any suitable hot air distribution manifold may be used including, for example, a piccolo tube or a swirl nozzle. In addition, as shown in FIG. 7, a plurality of coils 332 may be used with each coil 332 being distributed in the circumferential direction of the lip 144. The coils 332 are examples of a conduit that is fluidly coupled to the steam line 312 to receive the combustion gases and to have the combustion gases flow therethrough.

In the embodiment shown in FIGS. 7 and 8, the ice protection system 302 is applied to the lip 144 of the nacelle 140. The ice protection system 302 may, however, be applied to other suitable external surfaces of the aircraft and the engine, particularly, external surfaces configured to have air flow over the external surface as the aircraft flies through the air. These external surfaces of the aircraft and the engine may include, for example, various inlets and/or airfoils of the aircraft 10, or other surfaces internal to the engine 100, such as the splitter 160 or the inlet guide vane 166. As shown in FIG. 1, a leading edge 20 of the wing 14 is another example of an external surface implementing the ice protection system 302 discussed herein. Similar to the wing 14, the ice protection system 302 may also be implemented on horizontal and vertical surfaces of the tail (empennage 16).

Figure 9:
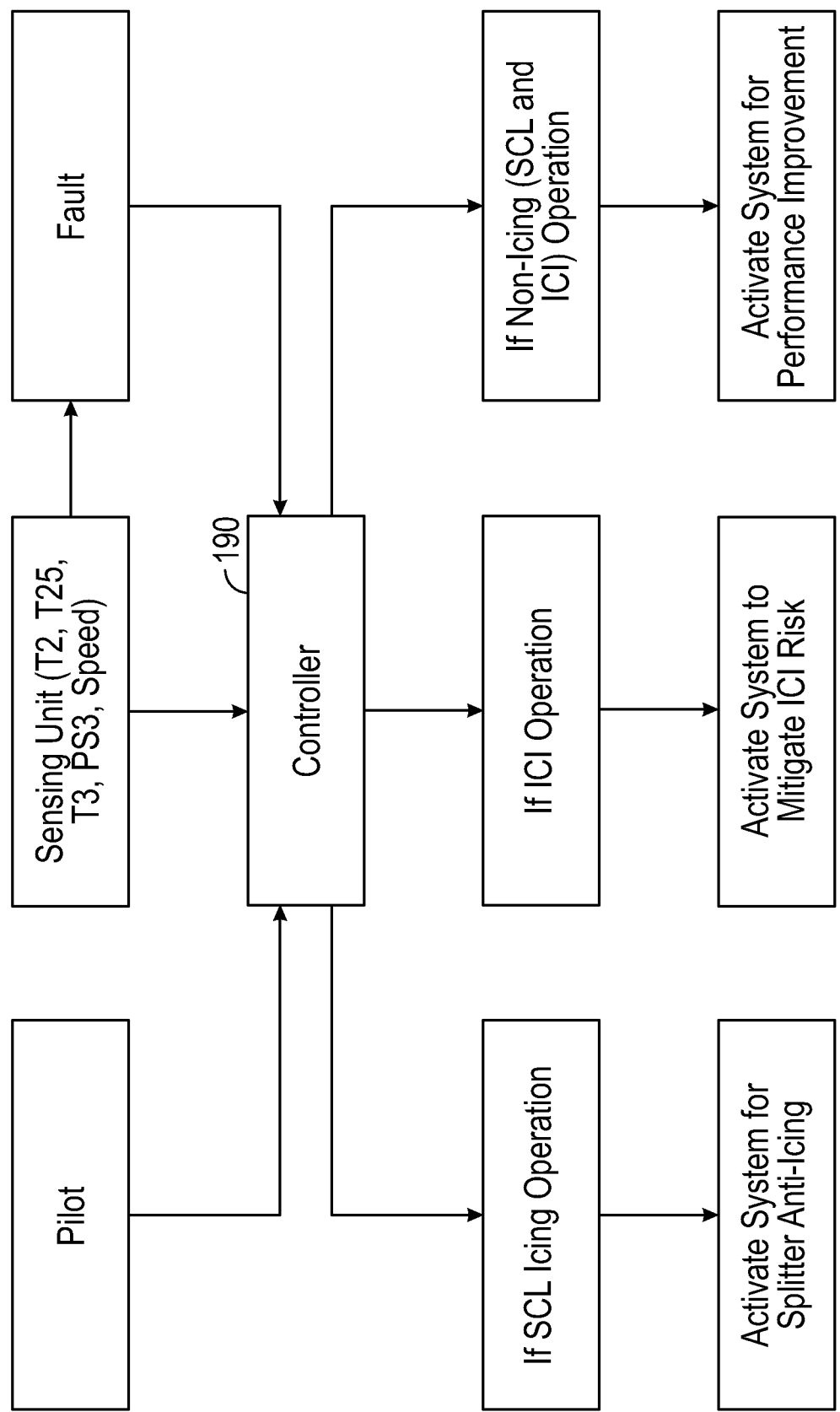
FIG. 9 is a schematic diagram for the control system for the ice protection systems discussed herein.

FIG. 9 is a schematic diagram for the control system for the ice protection systems 300, 302 discussed herein. The engine controller 190 is configured to receive an input indicating that icing conditions are present, and, in response to that input, the engine controller 190 is configured to activate the ice protection system 300. In some embodiments, this step may be a manual step, such as the pilots of the aircraft 10 selecting an option to activate the ice protection system 300, but, in other embodiments, the controller 190 is configured to receive other inputs and to determine from those other inputs that icing conditions are present. Such inputs include, for example, temperature of the air at the inlet 152 to the fan section 102 or the temperature in the core air passage 121. Such temperatures including, for example, the temperature at the inlet 108, the temperature upstream or downstream of the LP compressor 110, and the temperature upstream or downstream of the HP compressor 112. Other inputs include pressures at these locations and the speed (e.g., RPMs) of the engine 100.

The controller 190 may be directly, communicatively, coupled to sensors to determine these inputs. The controller 190 may also be indirectly coupled to such sensors and receive inputs from another source, such as a flight controller for the aircraft 10. When the controller 190 determines that icing conditions are present, the controller 190 activates the ice protection system 300. For example, the engine controller 190 may determine, based on the inputs, that conditions indicate SCL icing, and the engine controller 190 activates the ice protection system 300. Likewise, the engine controller 190 may determine, based on the inputs, that conditions indicate ICI icing, and the engine controller 190 activates the ice protection system 300. Also, as discussed above, the engine controller 190 may determine from the inputs that non-icing conditions are present, but that the components in the core air passage 121, such as the LP compressor 110, the HP compressor 112, and/or the combustor 176, are operating above a temperature setpoint (e.g., cooling is desired), and the engine controller 190 activates the ice protection system 300. When the air flowing into the core air passage 121 is hot (high temperatures), for example, the LP compressor 110 and the HP compressor 112 may not operate as efficiently, and the ice protection system 300 can be utilized to reduce the temperature and to improve the operating efficiency of the LP compressor 110 and the HP compressor 112. For ICI accretion, ICI detection methods based on the measured temperature in the engine 100 and, more specifically, the core air passage 121 may be used to determine presence of ICI conditions. For SCL icing, a temperature sensor on the fan inlet (T2 sensor) combined with aircraft information (e.g., altitude, speed, and total air temperature (TAT)) may be used in to determine if anti-icing is required. The Federal Aviation Administration standard formulas may be used to make the determination for SCL icing. In addition, pilot can also activate anti-icing system anytime if needed. For hot weather operation, the temperature from the T2 sensor may be used for activation of the system to improve compressor performance or for nitrogen oxide (NOx) reduction.

As discussed above, the controller 190 is communicatively and operably coupled valves 304 fluidly connected to the delivery assembly 310 and, more specifically in the steam line 312 and in the water line 316, to control the flow of steam or condensed water therethrough. The controller 190 is configured to activate, deactivate, or otherwise control the systems in the manner discussed above, by opening or closing one or more of the valves 304.

In aircraft using hydrogen fuel (diatomic hydrogen), the combustion products include water vapor. The water vapor in these combustion products can be directly used within the engine for various axiality uses. This steam byproduct may be used, for example, to remove ice buildup (de-icing) and to prevent ice buildup (anti-icing) and in the various ice protection systems 300, 302 discussed herein. Further aspects of the present disclosure are provided by the subject matter of the following clauses.

A gas turbine engine includes an ice protection system for an aircraft surface. The gas turbine engine comprises a core air passage, a combustor, a steam line, an external surface, and a conduit. The core air passage is for air to flow therethrough in an airflow direction and the air includes oxygen. The combustor is located in the core air passage and is fluidly coupled to a hydrogen fuel source to receive the hydrogen fuel and to combust the hydrogen fuel producing combustion gases including water vapor. The steam line is fluidly coupled to the core air passage at a position downstream of the combustor relative to the airflow direction to receive a portion of the combustion gases. The external surface for the aircraft has air flow over the external surface as the aircraft operates. The conduit is fluidly coupled to the steam line to receive the combustion gases and to have the combustion gases flow therethrough, and the conduit is thermally coupled to the external surface to heat the external surface as the combustion gases flow through the conduit.

An aircraft comprises the gas turbine engine of the preceding clause and an airfoil having a leading edge. The external surface is the leading edge of the airfoil.

The aircraft of any preceding clause, wherein the airfoil is a wing.

The gas turbine engine of any preceding clause, further comprising a nacelle defining an inlet, the nacelle including a lip having an outer surface, the outer surface of the lip being the external surface.

The gas turbine engine of any preceding clause, wherein the lip includes a cavity, the cavity being the conduit.

The gas turbine engine of any preceding clause, wherein the conduit is a coil thermally coupled to the outer surface of the lip.

The gas turbine engine of any preceding clause, further comprising a splitter separating an inlet from a bypass airflow passage. The splitter includes a lip having an outer surface, and the outer surface of the lip is the external surface.

The gas turbine engine of any preceding clause, wherein the lip includes a cavity, and the cavity is the conduit.

The gas turbine engine of any preceding clause, wherein the conduit is a coil thermally coupled to the outer surface of the lip.

A gas turbine engine comprises a core air passage, a combustor, a steam line, a water vapor condenser, and at least one nozzle. The core air passage is for air flow to therethrough in an airflow direction. The combustor is located in the core air passage and is fluidly coupled to a hydrogen fuel source to receive the hydrogen fuel and to combust the hydrogen fuel producing combustion gases including water vapor. The steam line is fluidly coupled to the core air passage at a position downstream of the combustor relative to the airflow direction to receive a portion of the combustion gases. The water vapor condenser is fluidly connected to the steam line to receive the combustion gases, and the water vapor condenser includes a heat sink to extract the heat from the combustion gases and to condense the water vapor of the combustion gases. The at least one nozzle is fluidly coupled to the water vapor condenser to receive the condensed water, and the nozzle is positioned to inject the condensed water into the core air passage.

The gas turbine engine of the preceding clause, further comprising a high-pressure turbine located in the core air passage downstream of the combustor and a low-pressure turbine located in the core air passage downstream of the high-pressure turbine, wherein the steam line is fluidly coupled to the core air passage within the low-pressure turbine.

The gas turbine engine of any preceding clause, further comprising a high-pressure turbine located in the core air passage downstream of the combustor and a low-pressure turbine located in the core air passage downstream of the high-pressure turbine, wherein the steam line is fluidly coupled to the core air passage downstream of the low-pressure turbine.

The gas turbine engine of any preceding clause, wherein the at least one nozzle is positioned to inject the condensed water into the combustor.

The gas turbine engine of any preceding clause, further comprising a water demineralization filter positioned between the water vapor condenser and at least one nozzle to filter the condensed water.

The gas turbine engine of any preceding clause, further comprising a compressor located in the core air passage upstream of the combustor The at least one nozzle is positioned to inject the condensed water upstream of the compressor.

The gas turbine engine of any preceding clause, wherein the compressor includes a plurality of vanes and a plurality of compressor blades. The at least one nozzle is positioned to inject the condensed water upstream of the plurality of vanes.

The gas turbine engine of any preceding clause, wherein the core air passage includes an inlet. The at least one nozzle is positioned to inject the condensed water into the inlet.

The gas turbine engine of any preceding clause, further comprising a plurality of the at least one nozzle. The inlet is annular having a circumferential direction, and the plurality of the at least one nozzle is arrayed in the circumferential direction of the inlet.

The gas turbine engine of any preceding clause, wherein the heat sink is a working fluid.

The gas turbine engine of any preceding clause, wherein the working fluid is supercritical carbon dioxide.

The gas turbine engine of any preceding clause, further comprising a fuel system comprising a fuel tank, a fuel delivery assembly, and a vaporizer. The fuel tank is the fuel source containing hydrogen fuel in a liquid state. The fuel delivery assembly fluidly connects the fuel tank with the combustor to provide hydrogen fuel to the combustor. The vaporizer is in fluid communication with the fuel delivery assembly, the vaporizer being thermally connected to a heat source to heat the hydrogen fuel flowing through the vaporizer, wherein the water vapor condenser is in fluid communication with the fuel delivery assembly, and the hydrogen fuel being the heat sink.

The gas turbine engine of any preceding clause, wherein the water vapor condenser is positioned upstream of the vaporizer.

The gas turbine engine of any preceding clause, further comprising a turbine located in the core air passage downstream of the combustor. The steam line is fluidly coupled to the core air passage at a position downstream of the turbine.

The gas turbine engine of any preceding clause, further comprising a core air heat exchanger located in the core air passage downstream of the turbine. The steam line is fluidly coupled to the core air passage at a position downstream of the core air heat exchanger.

The gas turbine engine of any preceding clause, further comprising a fuel system including a fuel tank, a fuel delivery, and a vaporizer. The fuel tank is the fuel source containing hydrogen fuel in a liquid state. The fuel delivery assembly fluidly connects the fuel tank with the combustor to provide hydrogen fuel to the combustor. The vaporizer is in fluid communication with the fuel delivery assembly, and the vaporizer is thermally connected to the core air heat exchanger to heat the hydrogen fuel flowing through the vaporizer.

The gas turbine engine of any preceding clause, further comprising an ice protection system and a controller. The at least one nozzle is a part of the ice protection system, and the controller is configured to activate the ice protection system to discharge the condensed water from the at least one nozzle.

The gas turbine engine of any preceding clause, wherein the controller is configured to receive at least one input, to determine based on the at least one input if icing conditions are present, and to activate the ice protection system when the controller determines icing conditions are present.

The gas turbine engine of any preceding clause, wherein, when the controller determines icing conditions are not present, the controller is further configured to determine if a component in the core air passage is operating above a temperature set point and to activate the ice protection system when the controller determines that the component is operating above the temperature set point.

A method of producing steam for auxiliary uses in a gas turbine engine. The method includes causing air to flow through a core air passage, the air containing oxygen, combusting hydrogen fuel in a combustor located in the core air passage to produce combustion gases including water vapor, extracting at least a portion of the combustion gases from the core air passage at a position downstream of the combustor, and using the extracted combustion gases in an auxiliary system.

The method of the preceding clause, wherein the combustion gases are extracted from the core air passage at a position downstream of a low-pressure turbine, the low-pressure turbine being located in the core air passage downstream of a high-pressure turbine, and the high-pressure turbine being located in the core air passage downstream of the combustor.

The method of any preceding clause, wherein the combustion gases are extracted from the core air passage within a low-pressure turbine, the low-pressure turbine being located in the core air passage downstream of a high-pressure turbine, and the high-pressure turbine being located in the core air passage downstream of the combustor.

The method of any preceding clause, further comprising causing air to flow over an external surface of an aircraft and heating the external surface of the aircraft with the extracted combustion gases, the auxiliary system being a deicing system to heat the external surface of the aircraft.

The method of any preceding clause, wherein the external surface of the aircraft is an outer surface of a lip of a nacelle, the nacelle defining an inlet of the gas turbine engine.

The method of any preceding clause, wherein the external surface of the aircraft is a leading edge of an airfoil.

The method of any preceding clause, wherein the airfoil is a wing of an aircraft.

The method of any preceding clause, further comprising condensing the water vapor in the extracted combustion gases using a water vapor condenser.

The method of any preceding clause, wherein condensing the water vapor in the extracted combustion gases includes removing heat from the extracted combustion gases with a working fluid.

The method of any preceding clause, wherein the working fluid is one of supercritical carbon dioxide and hydrogen fuel.

The method of any preceding clause, wherein the combustion gases are extracted from the core air passage at a position downstream of a turbine, the turbine being located in the core air passage downstream of the combustor.

The method of any preceding clause, wherein the combustion gases are extracted from the core air passage at a position downstream of a core air heat exchanger, the core air heat exchanger being located in the core air passage downstream of the turbine.

The method of any preceding clause, further comprising storing hydrogen fuel in the liquid phases in a fuel tank, heating the hydrogen fuel in the liquid phase to at least one of a gaseous phase and a supercritical phase using a vaporizer thermally connected to the core air heat exchanger, and delivering the hydrogen fuel in at least one of a gaseous phase and a supercritical phase to the combustor.

The method of any preceding clause, wherein the auxiliary system is an ice protection system including at least one nozzle, and the method further comprises injecting the condensed water into the core air passage with the at least one nozzle.

The method of any preceding clause, wherein the at least one nozzle is positioned to inject the condensed water upstream of a compressor.

The method of any preceding clause, wherein the core air passage includes an inlet, the at least one nozzle being positioned to inject the condensed water into the inlet.

The method of any preceding clause, wherein a plurality of the at least one nozzle is arrayed in a circumferential direction of the inlet.

Although the foregoing description is directed to the preferred embodiments, other variations and modifications will be apparent to those skilled in the art, and may be made without departing from the spirit or the scope of the disclosure. Moreover, features described in connection with one embodiment may be used in conjunction with other embodiments, even if not explicitly stated above.

The invention claimed is:

1. A gas turbine engine comprising:
a core air passage for air to flow therethrough in an airflow direction;
a combustor located in the core air passage and fluidly coupled to a hydrogen fuel source to receive hydrogen fuel and to combust the hydrogen fuel producing combustion gases including water vapor;
a steam line fluidly coupled to the core air passage at a position downstream of the combustor relative to the airflow direction to receive a portion of the combustion gases with the water vapor;
a water vapor condenser fluidly connected to the steam line to receive the combustion gases with the water vapor, the water vapor condenser including a heat sink to extract heat from the combustion gases and to condense the water vapor of the combustion gases; and
an ice protection system including:
at least one nozzle fluidly coupled to the water vapor condenser to receive condensed water, the at least one nozzle being positioned to inject the condensed water into the core air passage; and
a controller configured to activate the ice protection system to discharge the condensed water from the at least one nozzle.

2. The gas turbine engine of claim 1, further comprising a compressor located in the core air passage upstream of the combustor, the at least one nozzle being positioned to inject the condensed water upstream of the compressor.

3. The gas turbine engine of claim 1, wherein the heat sink is supercritical carbon dioxide.

4. The gas turbine engine of claim 1, wherein the core air passage includes an inlet, the at least one nozzle being positioned to inject the condensed water into the inlet.

5. The gas turbine engine of claim 4, further comprising a plurality of the at least one nozzle,
wherein the inlet is annular having a circumferential direction, the plurality of the at least one nozzle being arrayed in the circumferential direction of the inlet.

6. The gas turbine engine of claim 1, further comprising a fuel system comprising:
a fuel tank, the fuel tank being the hydrogen fuel source containing the hydrogen fuel in a liquid state;
a fuel delivery assembly fluidly connecting the fuel tank with the combustor to provide the hydrogen fuel to the combustor; and
a vaporizer in fluid communication with the fuel delivery assembly, the vaporizer being thermally connected to a heat source to heat the hydrogen fuel flowing through the vaporizer,
wherein the water vapor condenser is in fluid communication with the fuel delivery assembly, and the hydrogen fuel is the heat sink.

7. The gas turbine engine of claim 6, wherein the water vapor condenser is positioned upstream of the vaporizer.

8. The gas turbine engine of claim 1, further comprising a turbine located in the core air passage downstream of the combustor, the steam line fluidly coupled to the core air passage at a position downstream of the turbine.

9. The gas turbine engine of claim 8, further comprising a core air heat exchanger located in the core air passage downstream of the turbine, the steam line fluidly coupled to the core air passage at a position downstream of the core air heat exchanger.

10. The gas turbine engine of claim 9, further comprising a fuel system including:
a fuel tank, the fuel tank being the hydrogen fuel source containing the hydrogen fuel in a liquid state;
a fuel delivery assembly fluidly connecting the fuel tank with the combustor to provide the hydrogen fuel to the combustor; and
a vaporizer in fluid communication with the fuel delivery assembly, the vaporizer being thermally connected to the core air heat exchanger to heat the hydrogen fuel flowing through the vaporizer.

11. The gas turbine engine of claim 1, further comprising a valve fluidly connected to the steam line or the at least one nozzle, wherein, when the valve is fluidly connected to the steam line, the valve is positionable to control a flow of combustion gases with the water vapor through the steam line, and when the valve is fluidly connected to the at least one nozzle, the valve positionable to control a flow of the condensed water from the at least one nozzle, and wherein the controller being operatively coupled to the valve to position the valve when activating the ice protection system.

\* \* \* \* \*